(12) United States Patent
Rong et al.

(10) Patent No.: US 11,092,449 B2
(45) Date of Patent: Aug. 17, 2021

(54) METHODS AND SYSTEMS FOR PROVIDING TRANSPORTATION SERVICE

(71) Applicant: BEIJING DIDI INFINITY TECHNOLOGY AND DEVELOPMENT CO., LTD., Beijing (CN)

(72) Inventors: Jue Rong, Beijing (CN); Beibei Zhang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 221 days.

(21) Appl. No.: 16/237,164

(22) Filed: Dec. 31, 2018

(65) Prior Publication Data

US 2019/0137291 A1 May 9, 2019

Related U.S. Application Data

(63) Continuation of application No. PCT/CN2018/089119, filed on May 31, 2018.

(30) Foreign Application Priority Data

Jun. 1, 2017 (CN) .......................... 201710404496.2
Jul. 26, 2017 (CN) .......................... 201710617617.1

(51) Int. Cl.
*G01C 21/00* (2006.01)
*G01C 21/34* (2006.01)
(Continued)

(52) U.S. Cl.
CPC ..... *G01C 21/3438* (2013.01); *G01C 21/3492* (2013.01); *G06Q 10/02* (2013.01); *G06Q 50/30* (2013.01)

(58) Field of Classification Search
CPC ............ G01C 21/3438; G01C 21/3492; G01C 21/00; G06Q 10/02; G06Q 50/30
(Continued)

(56) References Cited

U.S. PATENT DOCUMENTS 10,088,326 B1* 10/2018 Aula ...................... G01C 21/26
10,685,416 B2* 6/2020 Tolkin .................... G06Q 50/30
(Continued)

FOREIGN PATENT DOCUMENTS

CA     2 974 452 A1    7/2016
CN    102270386 A     12/2011
(Continued)

OTHER PUBLICATIONS

First Office Action for Chinese Application No. 201710404496.2 dated Dec. 2, 2019, 43 pages.
(Continued)

*Primary Examiner* — Shardul D Patel
(74) *Attorney, Agent, or Firm* — Bayes PLLC (57) ABSTRACT

Systems and methods for providing transportation service to a passenger are disclosed. An exemplary method for providing transportation service may include receiving a passenger position from a terminal device, and receiving a vehicle position from a vehicle. The vehicle is matched to provide the transportation service to the passenger. The method may further include determining, by a processor, pick-up locations for the vehicle to pick up the passenger, and providing the terminal device with the pick-up locations. The method may also include receiving, from the terminal device, a selected pick-up location; and navigating the vehicle and the passenger according to the selected pick-up location.

20 Claims, 6 Drawing Sheets

(51) Int. Cl.
  *G06Q 50/30* (2012.01)
  *G06Q 10/02* (2012.01)
(58) Field of Classification Search
  USPC .......................................................... 701/423
  See application file for complete search history.

(56) References Cited

U.S. PATENT DOCUMENTS

| | | | |
|---|---|---|---|
| 2013/0132140 A1* | 5/2013 | Amin ..................... | G06Q 10/06 |
| | | | 705/7.13 |
| 2015/0339923 A1 | 11/2015 | König et al. | |
| 2016/0364679 A1* | 12/2016 | Cao ........................ | G06Q 50/30 |
| 2017/0003687 A1 | 1/2017 | Kojo et al. | |
| 2017/0147951 A1 | 5/2017 | Meyer et al. | |
| 2018/0033112 A1* | 2/2018 | Wu .......................... | G08G 1/00 |
| 2018/0181910 A1* | 6/2018 | Zhang .................. | G06Q 10/083 |
| 2018/0196416 A1* | 7/2018 | Lagnemma ............ | G06Q 50/30 |
| 2019/0349452 A1* | 11/2019 | Jow ....................... | G06F 3/0484 |
| 2020/0402194 A1 | 12/2020 | Wu et al. | |

FOREIGN PATENT DOCUMENTS

| | | |
|---|---|---|
| CN | 103440685 A | 12/2013 |
| CN | 103458368 A | 12/2013 |
| CN | 104580499 A | 4/2015 |
| CN | 104715286 A | 6/2015 |
| CN | 104732471 A | 6/2015 |
| CN | 105677793 A | 3/2016 |
| CN | 105575104 A | 5/2016 |
| CN | 106469514 A | 3/2017 |
| CN | 10677941 A | 5/2017 |
| CN | 106919993 A | 7/2017 |
| CN | 106920417 A | 7/2017 |
| JP | 2005308401 A | 11/2005 |
| JP | 2016509287 A | 3/2016 |
| WO | 2015018309 A1 | 2/2015 |
| WO | 2016/116048 A1 | 7/2016 |
| WO | 2017071619 A1 | 5/2017 |

OTHER PUBLICATIONS

The Second Office Action in Chinese Application No. 201710404496.2 dated Jul. 27, 2020, 46 pages.
The Office Action in Canadian Application No. 3029568 dated Jun. 8, 2020, 6 pages.
International Scorch Report in PCT/CN2018/089119 dated Jul. 13, 2018, 4 pages.
Written Opinion in PCT/CN2018/089119 dated Jul. 13, 2018, 4 pages.
First Office Action in Chinese Application No. 201710617617.1 dated Mar. 12, 2020, 21 pages.
Decision to Refuse a European Patent Application issued in corresponding European Patent Application No. 18 808 989.0-1222, dated Oct. 1, 2020, 18 pages.
Examination report No. 3 for standard patent application issued in corresponding Australian Application No. 2018278003, dated Jan. 27, 2021, 7 pages.
Decision to Grant a Patent issued in corresponding Japanese Patent Application No. 2018-569051, dated Feb. 8, 2021, 6 pages.
First Examination Report issued in corresponding India Application No. 201817049832 dated Feb. 24, 2021, 8 pages.
Office action issued in corresponding Chinese Application No. 201880001972.9, dated May 8, 2021, 12 pages.
Written Opinion issued in corresponding Singapore Application No. 11201811765T, dated Jun. 4, 2021, 6 pages.

* cited by examiner

METHODS AND SYSTEMS FOR PROVIDING TRANSPORTATION SERVICE

CROSS REFERENCE TO RELATED APPLICATION

The present application is a Continuation of International Application No. PCT/CN2018/089119, filed on May 31, 2018, which is based on and claims the benefits of priority to Chinese Application No. 201710404496.2, filed Jun. 1, 2017, and Chinese Application No. 201710617617.1, filed Jul. 26, 2017. The entire contents of both applications are incorporated herein by reference.

TECHNICAL FIELD

The present disclosure relates to providing transportation services, and more particularly, to methods and systems for automatically determining a pick-up location for a passenger upon a transportation service request.

BACKGROUND

An online hailing platform (e.g., DiDi™ online) can receive a rideshare service request from a passenger and then route the service request to at least one transportation service provider (e.g., a taxi driver, a private car owner, or the like). The service request can be answered by a service provider, or assigned to a service provider if no one picks up the service request within a predetermined period.

The service provider matched for the transportation service provider typically waits where she is to be picked up. For example, she might request service from a hotel, and she will wait at the front entrance of the hotel for the service vehicle to pick her up. However, due to traffic conditions, having the provider pick up the passenger at the passenger position may not always be the most efficient approach. For example, if there is an accident near the hotel, it may take the vehicle 30 minutes or longer to navigate through the traffic and get to the hotel.

Embodiments of the present disclosure provide methods and systems that address the aforementioned shortcomings.

SUMMARY

Embodiments of the disclosure provide an exemplary method for providing transportation service to a passenger. The method may include receiving a passenger position from a terminal device and receiving a vehicle position from a vehicle. The vehicle is matched to provide the transportation service to the passenger. The method may further include determining, by a processor, pick-up locations for the vehicle to pick up the passenger and providing the terminal device with the pick-up locations. The method may also include receiving, from the terminal device, a selected pick-up location, and navigating the vehicle and the passenger according to the selected pick-up location.

Embodiments of the disclosure further disclose a system for providing transportation service to a passenger. The system may include a communication interface, at least one memory, and at least one processor coupled to the communication interface and the at least one memory. The communication interface may be configured to receive a passenger position from a terminal device and receive a vehicle position from a vehicle. The vehicle is matched to provide the transportation service to the passenger. The at least one processor may be configured to determine pick-up locations for the vehicle to pick up the passenger and provide the terminal device with the pick-up locations. The at least one processor may also be configured to receive from the terminal device a selected pick-up location, and navigate the vehicle and the passenger according to the selected pick-up location.

Embodiments of the disclosure further disclose a non-transitory computer-readable medium. The non-transitory computer-readable medium may store a set of instructions, when executed by at least one processor of an electronic device, cause the electronic device to perform a method for providing transport service to a passenger. The method may include receiving a passenger position from a terminal device and receiving a vehicle position from a vehicle. The vehicle is matched to provide the transportation service to the passenger. The method may further include determining, by a processor, pick-up locations for the vehicle to pick up the passenger and providing the terminal device with the pick-up locations. The method may also include receiving, from the terminal device, a selected pick-up location, and navigating the vehicle and the passenger according to the selected pick-up location.

Embodiments of the disclosure also provide an exemplary method for providing transportation service to a passenger. The method may include receiving a passenger position from a terminal device. The method may further include determining, by a processor, candidate locations within a region determined based on the passenger position and determining, by the processor, a trip indicator for each candidate location. The method may also include selecting, by the processor, a pick-up location among the candidate locations based on the trip indicator and providing a pedestrian route to the terminal device for navigating the passenger to the selected pick-up location.

Embodiments of the disclosure further disclose a system for providing transportation service to a passenger. The system may include a communication interface, at least one memory, and at least one processor coupled to the communication interface and the at least one memory. The communication interface may be configured to receive a passenger position from a terminal device. The at least one processor may be configured to determine candidate locations within a region determined based on the passenger position and determining a trip indicator for each candidate location. The at least one processor may be further configured to select, by the processor, a pick-up location among the candidate locations based on the trip indicator and provide a pedestrian route to the terminal device for navigating the passenger to the selected pick-up location.

Embodiments of the disclosure further disclose a non-transitory computer-readable medium. The non-transitory computer-readable medium may store a set of instructions, when executed by at least one processor of an electronic device, cause the electronic device to perform a method for providing transport service to a passenger. The method may include receiving a passenger position from a terminal device. The method may further include determining, by a processor, candidate locations within a region determined based on the passenger position and determining, by the processor, a trip indicator for each candidate location. The method may also include selecting, by the processor, a pick-up location among the candidate locations based on the trip indicator and providing a pedestrian route to the terminal device for navigating the passenger to the selected pick-up location.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An aspect of the disclosure is directed to a system for providing transportation service information. In some embodiments, the system may be configured to receive a passenger position from a terminal device (e.g., a mobile phone, wearable, GPS device, etc. used by a passenger requesting a transportation service). In some embodiments, if the passenger has been matched with a service vehicle that will provide the transportation service to the passenger, the system may also be configured to receive a vehicle position (e.g., from the service vehicle, a navigation device onboard the service vehicle, a mobile device used by a driver of the service vehicle, or the like).

In some embodiments, if the transportation service request has already been matched with a service vehicle, the system may be configured to determine pick-up locations for the service vehicle to pick up the passenger and provide the terminal device with the pick-up locations. For example, the pick-up locations may include the passenger position, the vehicle position, and one or more additional locations between the passenger and the vehicle, such as a landmark, a crossroad, etc. The system may be further configured to receive, from the terminal device, a selected pick-up location. Based on the selection, the system may navigate the vehicle and the passenger to the selected pick-up location, such as by providing a navigation route.

In some embodiments, the system may instead determine the pick-up location for the passenger before matching the transportation service request with a service vehicle. The system may first determine candidate locations (e.g., locations that were previously used as pick-up locations or locations otherwise convenient for pickups) within a region determined based on the passenger position.

The system may then determine a trip indicator for each candidate location. The trip indicator can be a traffic indicator, distance indicator, or a combination thereof. In some embodiments, the system may further determine a historical indicator. Based on the trip indicator and historical indicator, the system may select a pick-up location among the candidate locations. For example, an ideal pick-up location should be associated with a low trip indicator, and/or a high historical indicator. The selected pick-up location along with a pedestrian route may be provided to the terminal device for navigating the passenger to the selected pick-up location. After determining the pick-up location, the system may further match the transportation service request with a service vehicle based on the pick-up location.

Figure 1:
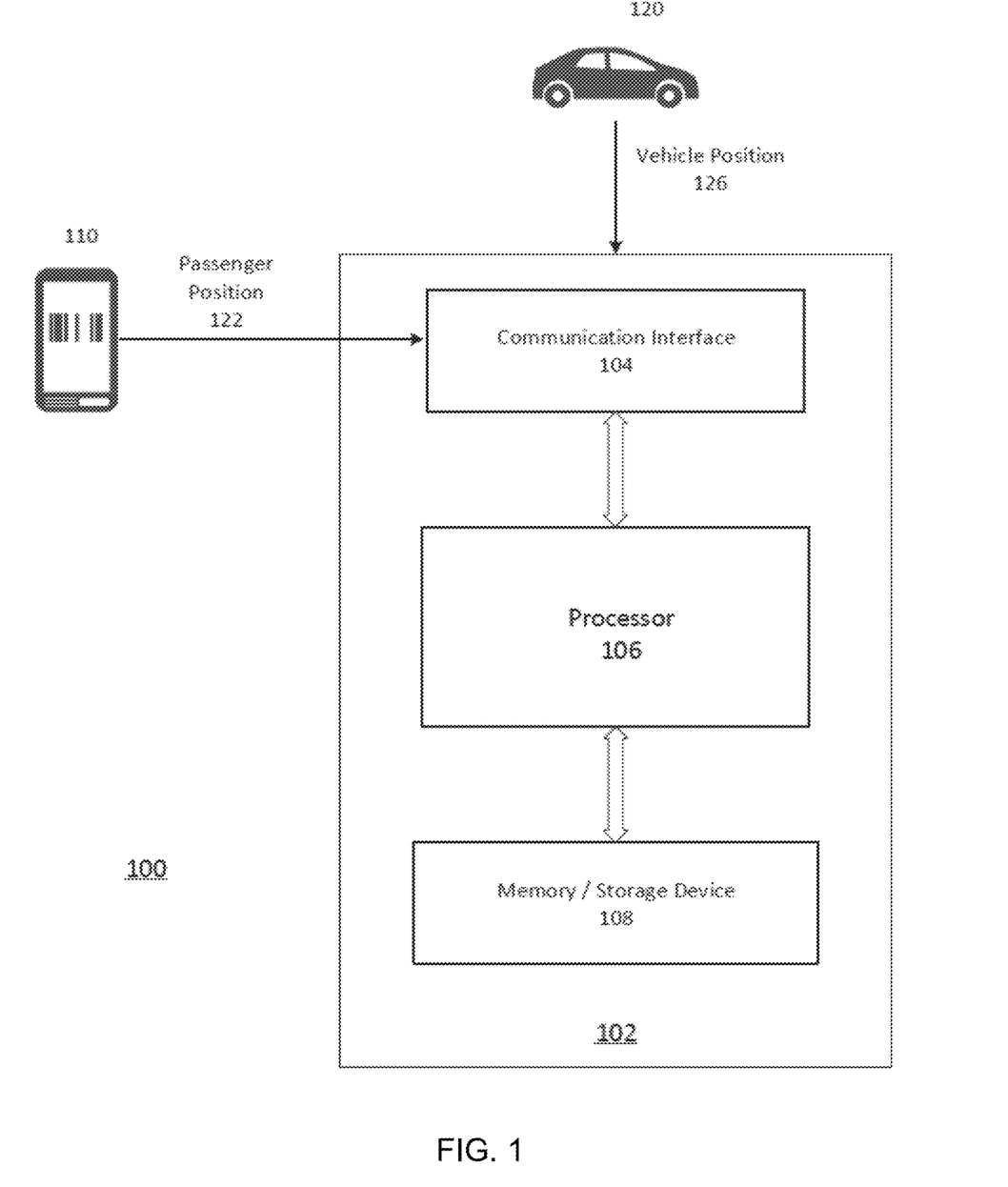
FIG. 1 illustrates a schematic diagram of an exemplary system for providing transportation service, according to embodiments of the disclosure.

FIG. 1 illustrates a schematic diagram of an exemplary system 100 for providing transportation service, according to embodiments of the disclosure. System 100 may include a transportation service management server 102 (also referred to as server 102 for simplicity). Server 102 can be a general-purpose server or a proprietary device specially designed for providing transportation service. It is contemplated that, server 102 can be a stand-alone system (e.g., a server) or an integrated component of a stand-alone server. Because processing transportation service may require significant computation resources, in some embodiments, server 102 may be preferably implemented as a stand-alone system. In some embodiments, server 160 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 102 may be located in a cloud, or may be alternatively in a single location (such as inside a service vehicle 120 or a terminal device 110) or distributed locations. Components of server 102 may be in an integrated device, or distributed at different locations but communicate with each other through a network (not shown).

In some embodiments, as shown in FIG. 1, server 102 may include a communication interface 104, a processor 106, and a memory/storage device 108. Although FIG. 1 shows communication interface 104, processor 106, and memory/storage device 108 all within one server 102, it is contemplated that these components may be distributed among multiple devices located near to or remotely with respect to each other. In some embodiments, server 102 may be implemented in the cloud, or on a separate computer/server.

Communication interface 104 can be an integrated services digital network (ISDN) card, cable modem, satellite modem, or a modem to provide a data communication connection. As another example, communication interface 104 can be a local area network (LAN) card to provide a data communication connection to a compatible LAN. Wireless links can also be implemented by communication interface 104. In such an implementation, communication interface 104 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 104 may be configured to receive a transportation service request from terminal device 110. A passenger terminal 110 may include any suitable device that can interact with a user, e.g., a smart phone, a tablet, a wearable device, a computer, or the like. Transportation service request may include a current location of the passenger (passenger position 122), a destination of the requested transportation service, a request time, or the like.

Generally, passenger position 122 can be the same or substantially close to a location of the terminal device 110. However, it is contemplated that, passenger position 122 can also differ from the location of the terminal device 110, even if the transportation service request is sent from terminal device 110. For example, a user can request a transportation service from a computer for her friend, who is distant from this user. In that case, the user may manually provide passenger position 122 on terminal device 110.

In some embodiments, the transportation service request may indicate that it has been accepted by or otherwise matched with a service vehicle 120. Service vehicle 120 will therefore pick up the passenger and provide transportation service to her. Consistent with the present disclosure, server 102 may be configured to determine a suitable pick-up location for service vehicle 120 to pick up the passenger.

Communication interface 104 may be configured to receive vehicle information from service vehicle 120. Service vehicles 120 may include taxi cars or private cars enrolled with an online hailing platform. In some embodiments, service vehicles 120 may also include autonomous vehicles. Vehicle information provided in this manner may include vehicle position 126, capacities, current driving directions, vehicle makers and models, as well as other features or characteristics associated with service vehicle 120. In some embodiments, service vehicle 120 may be associated with terminal devices such as navigation devices onboard vehicle 120 or mobile devices used by their drivers (e.g., smart phones, tablets, wearable devices, computers, or the like). These terminal devices may communicate with server 102 and provide vehicle position 126 to server 102 via communication interface 104.

In some embodiments, communication interface 104 may be configured to receive other data such as real-time traffic information, weather information, road blocking information, candidate locations to use as pick-up locations, historical records about these pick-up locations being used to recommend, etc.

Processor 106 may include any appropriate type of general-purpose or special-purpose microprocessor, digital signal processor, or microcontroller. Processor 106 may be configured as a separate processor module dedicated to providing transportation service. Alternatively, processor 106 may be configured as a shared processor module for performing other functions unrelated to providing transportation service. Processor 106 may include one or more hardware units (e.g., portions of an integrated circuit) designed for use with other components or to execute a part of a program. The program may be stored on a computer-readable medium, and when executed by processor 106, it may perform one or more functions.

In some embodiments, processor 106 may be configured to determine pick-up locations for vehicle 120 to pick up the passenger. For example, processor 106 may consider real-time traffic information to determine if vehicle 120 should be directed to pick up the passenger at a location other than passenger position 122. In some embodiments, the pick-up locations may be determined as on the route vehicle 120 will use to go to passenger position 122. Processor 106 may provide the pick-up locations to terminal device 110 to solicit user input regarding her choice of pick-up location. Upon receiving from the terminal device a selected pick-up location, processor 106 may be configured to provide navigate routes to the vehicle and the passenger to guide them to the selected pick-up location.

In some embodiments, the transportation service request may not be matched with any vehicle yet, and processor 106 may be configured to determine a pick-up location based solely on passenger position 122 and other user input from terminal device 110. Processor 106 may be configured to determine candidate locations within a region determined based on the passenger position. For example, a city may be divided into several zones, each having a plurality of predetermined locations for pickup. Processor 106 may first identify a zone that encloses the passenger position. For each candidate location in that zone, processor 106 may determine a trip indicator, which may be a traffic indicator indicating how much traffic it has around the location, a distance indicator indicating how far it is from passenger position 122, or a combination thereof. In some embodiments, processor 106 may further determine a historical indicator indicating how often or how recent the location was recommended to passengers. Based on the trip indicator and the historical indicator, processor 106 may be further configured to select a pick-up location among the candidate locations. For example, processor 106 may select the candidate location with the lowest traffic indicator (i.e., the least traffic) as the pick-up location. In another example, processor 106 may select the candidate location with the lowest distance indicator (i.e., the closest to the passenger so her walking distance to the pick-up location is the shortest) as the pick-up location. In yet another example, a threshold may be set for the traffic indicator or the distance indicator. When there are multiple candidate locations with indicators above the threshold, processor 106 may make the final selection based on the historical indicator. For instance, the location that was most recently recommended to a passenger may be selected. Alternatively, the location that was recommended to passengers for most times may be selected. Processor 106 may then provide a pedestrian route to the terminal device for navigating the passenger to the selected pick-up location.

Memory/storage device 108 may include any appropriate type of mass storage provided to store any type of information that processor 106 may need to operate. Memory/storage device 108 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory/storage device 108 may be configured to store one or more computer programs that may be executed by processor 106 to manage and coordinate transportation service disclosed herein. For example, memory/storage device 108 may be configured to store program(s) that may be executed by processor 106 to determine suitable pick-up locations for the passenger.

Memory/storage device 108 may be further configured to store information and data used by processor 106. For instance, memory/storage device 108 may be configured to store the various types of data (e.g., transportation service request, vehicle information, etc.) received by communication interface 104. Memory/storage device 108 may also store intermediate data such as pick-up locations, real-time traffic data, trip indicators, etc. The various types of data may be stored permanently, removed periodically, or disregarded immediately after each frame of data is processed.

Figure 2:
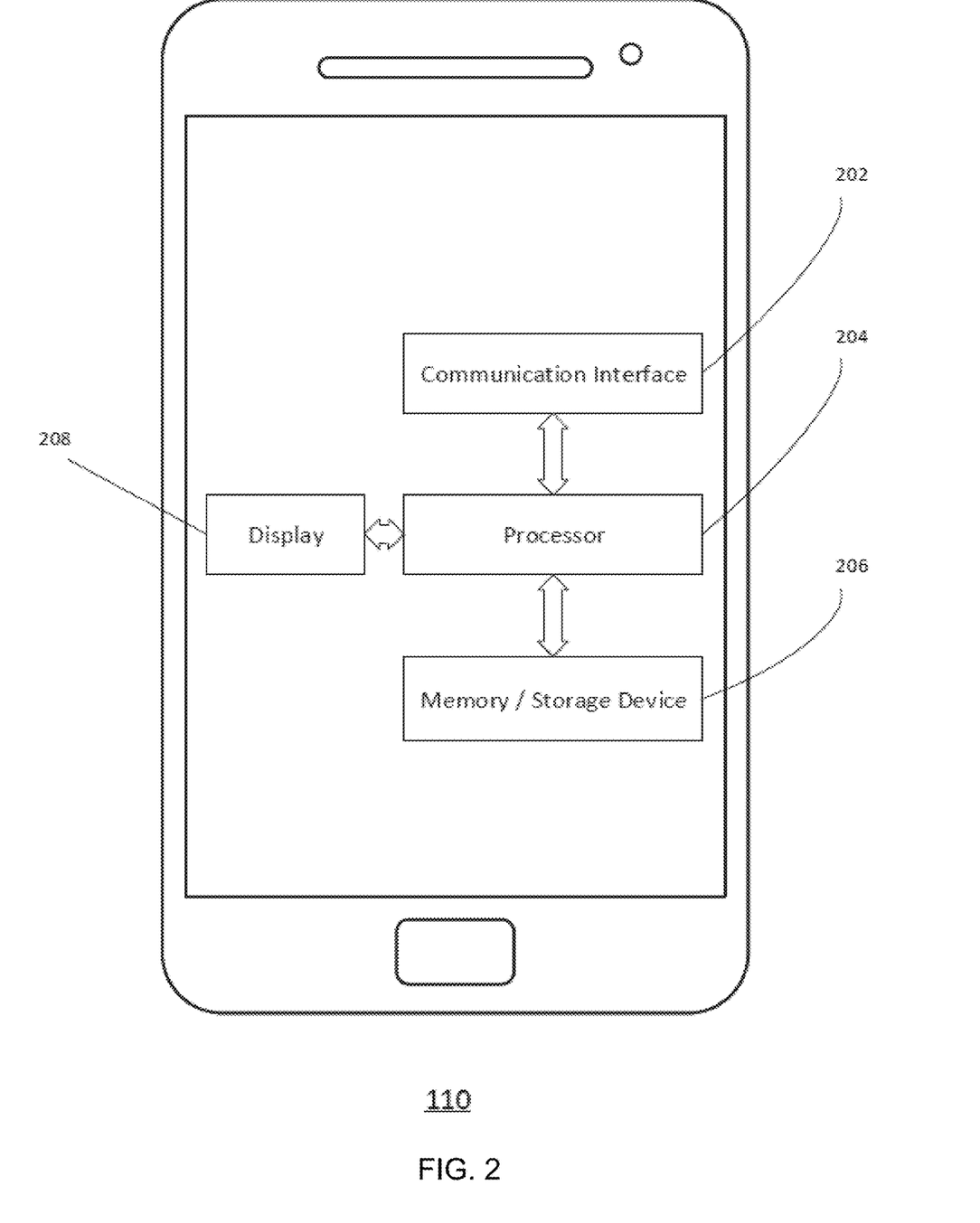
FIG. 2 illustrates a block diagram of an exemplary terminal device, according to embodiments of the disclosure.

FIG. 2 is a block diagram depicting an exemplary terminal device 110. Terminal device 110 may include a communication interface 202, a processor 204, a memory/storage device 206, and a display 208. Communication interface 202 may be configured in a manner similar to communication interface 104. Communication interface 202 may facilitate communications between terminal device 110 and server 102. Processor 204 may have similar hardware structures as processor 106. For example, processor 204 may include one or more hardware units (e.g., portions of an integrated circuit) designed for use with other components or to execute a part of a program. The program may be stored on a computer-readable medium (e.g., memory/storage device 206), and when executed by processor 204, it may perform one or more functions. Memory/storage device 206 may also have similar structures as memory/storage device 108.

Display 208 may include a display such as a Liquid Crystal Display (LCD), a Light Emitting Diode Display (LED), a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™.

In some embodiments, communication interface 202 may be configured to receive a transportation service request from a user of terminal device 110, who may or may not be the passenger. The transportation service request may include passenger position 122. In some embodiments, passenger position 122 may be captured by positioning device such as a Global Positioning System (GPS) receiver built into terminal device 110. In some embodiments, communication interface 202 may provide the transportation service request including passenger position 122 to server 102. Communication interface 202 may then receive one or more pick-up locations from server 102. When multiple pick-up locations are received, they may be presented as options to the user on display 208, and the user may select a pick-up location. Communication interface 202 may provide the selected pick-up location to server 102. In some embodiments, communication interface 202 may further receive a navigation route from server 102 to navigate the passenger to the pick-up location.

In some embodiments, processor 204 may determine the navigation route based on the selected pick-up location. Processor 204 may also perform some of the functions described above for processor 106. For example, processor 204 may be configured to perform one or more steps of determining the pick-up location.

Figure 3:
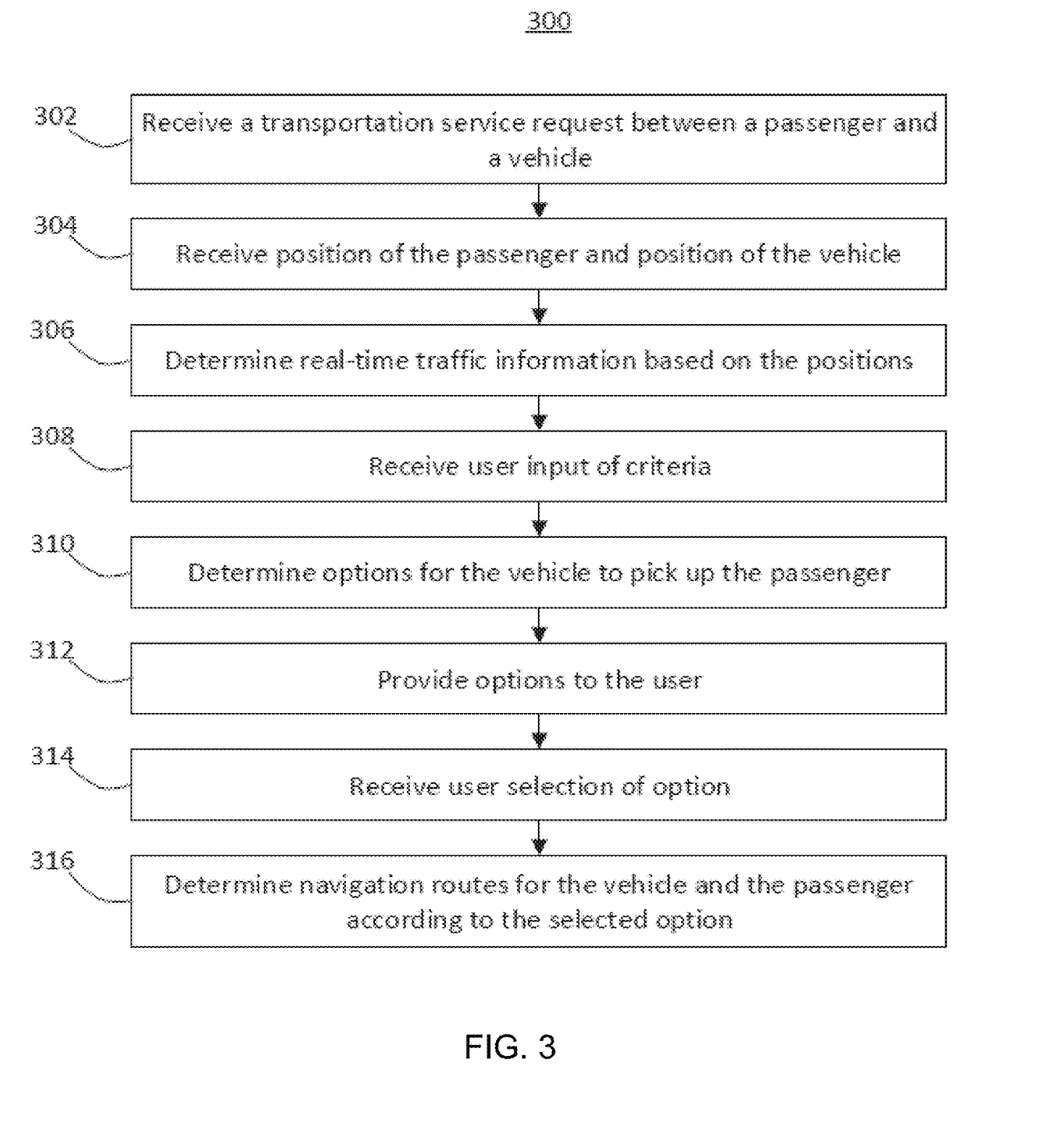
FIG. 3 illustrates a flowchart of an exemplary method for providing transportation service information, according to embodiments of the disclosure.

FIG. 3 is a flowchart illustrating an exemplary method 300 for providing transportation service consistent with disclosed embodiments. Method 300 may be implemented by server 102 and/or terminal device 110, each including at least one processor. In the description below, server 102 is used as an example for implementing method 300. It is contemplated that method 300 can also be implemented by terminal device 110, or jointly by server 102 and terminal device 110. Consistent with the present disclosure, method 300 determines pick-up options for a transportation service request that has been matched with a service vehicle. Method 300 may include several steps as described below, some of which may be optional.

Figure 4:
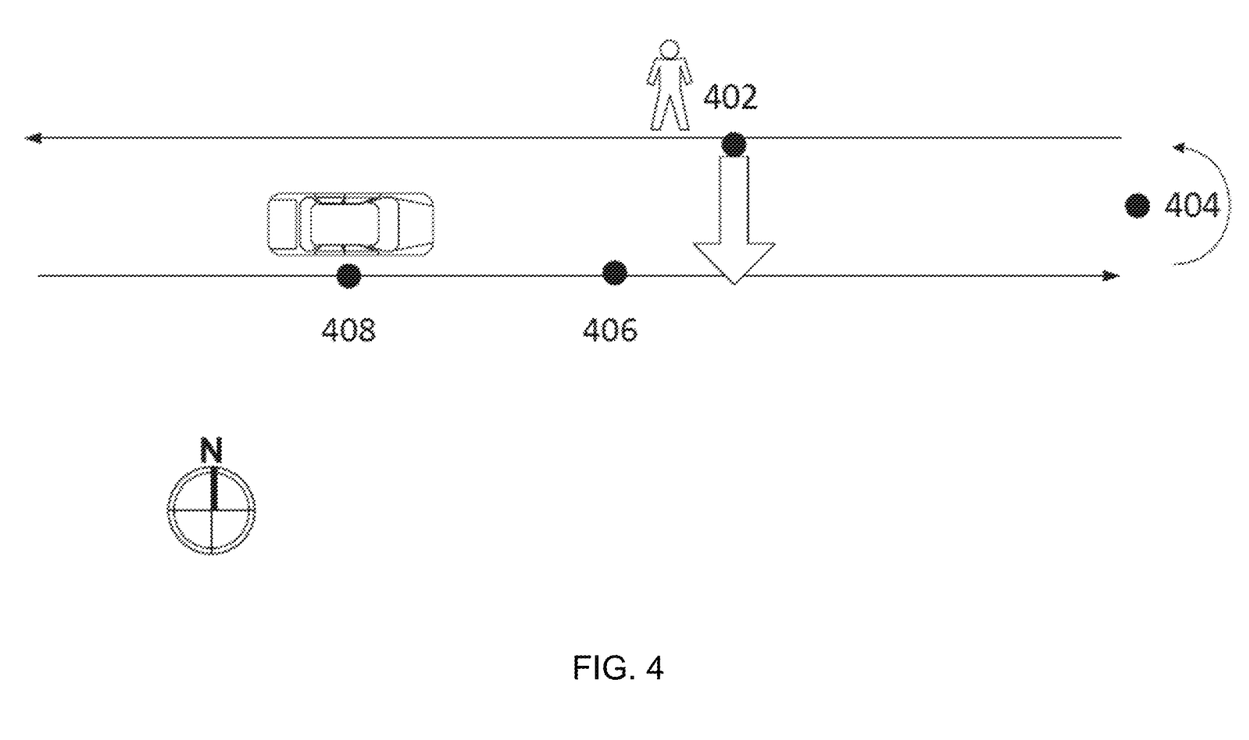
FIG. 4 illustrates determining a pick-up location between a passenger and a matched vehicle, according to embodiments of the disclosure.

FIG. 4 illustrates determining a pick-up location between a passenger and a matched vehicle, according to embodiments of the disclosure. FIG. 3 and FIG. 4 will be described together below.

In step 302, server 102 may receive a transportation service request between a passenger and a vehicle. For example, the transportation service request may be entered by a user on terminal device 110. Service vehicle 120 may be matched to the request to provide the transportation service to the passenger.

In step 304, server 102 may receive passenger position 122 from terminal device 110 and vehicle position 126 from vehicle 120. Passenger position 122 may be the position of terminal device 110 as captured by a positioning device embedded therein, or a position provided by the user. Vehicle position 126 may be captured by a positioning device embedded in vehicle 120. For example, as shown in FIG. 4, the passenger may be at position 402, and matched vehicle may be at position 408. Although the direct distance between position 402 and position 408 is short, positions 402 and 408 are on the different sides of the road. Vehicle is heading east, and in order to pick up the passenger at position 402, it has to proceed to position 404 and then make a U-turn.

In step 306, server 102 may acquire or otherwise receive real-time traffic information near or between the passenger position and vehicle position. For example, as shown in FIG. 4, there may be a car accident around position 404, and therefore the vehicle could only travel at 5 km/h approaching position 404.

In step 308, server 102 may receive user input of criteria indicating certain limits or preferences the passenger may have. For example, user may input a threshold distance (e.g., 200 meters) or time (e.g., 10 minutes) she is willing to walk to meet the driver. For example, user may input a threshold time she is willing to wait for the driver either at passenger position 122 or at an intermediate position.

In step 310, server 102 may determine multiple pick-up options based on the traffic condition as well as user inputs. In some embodiments, server 102 may automatically include passenger position 122 and vehicle position 126 as candidate pick-up locations. Server 102 may additionally determine one or more intermediate locations between passenger position 122 and vehicle position 126. Server 102 may further determine various parameters associated with each option. For example, exemplary parameters may include the total waiting time before the passenger is picked up, walking distance/time for the passenger to walk to the pick-up location, etc. These parameters may be compared with the criteria provided by the user. In some embodiments, some pick-up locations may be removed as options if the associated parameters exceed the user criteria.

In the example shown by FIG. 4, server 102 may consider three options: (1) let the passenger wait at passenger position 402, (2) let the passenger walk to an intermediate pick-up location 406 and have the service vehicle pick up the passenger at that location, and (3) let the service vehicle wait for passenger to walk to vehicle position 126. The parameters associated with the three options may be calculated as follows:

(1) Passenger Waiting Option: server 102 may first determine a quickest route for the vehicle to go from position 408 to position 402. In some embodiments, server 102 may consider traffic condition and estimate a driving time. For example, despite the accident near position 404, server 102 may determine that the quickest route under the circumstances would be for the vehicle to continue head east, make a U-turn at position 404, and then head west to position 402. Because of the accident, the vehicle will drive slowly, and it may take it 20 minutes to go from position 408 to position 404 and another 25 minutes to go from position 404 to position 402. The total waiting time for the passenger under this option is therefore estimated to be 45 minutes.

(2) Intermediate Pick-Up Option: server 102 may find a location 406 on the way of the vehicle and also close to the passenger such that the passenger can walk to location 406 while the vehicle is also traveling towards location 406. For example, the direct distance between the passenger and the vehicle may only be 50 meters. In some embodiments, server 102 may select pick-up location 406 based on an estimated walking time it takes the passenger to walk from position 402 to location 406 being roughly equal to an estimated driving time it takes the vehicle to travel from position 408 to location 406. In that case, the total waiting time before the passenger gets picked up is minimized. The total waiting time for option (2) may be 8 minutes, and the passenger needs to walk 35 meters to location 406.

(3) Vehicle Waiting Option: server 102 may first determine a shortest/quickest route for the passenger to walk from position 402 to position 408. For example, server 102 may determine that the shortest route is for the passenger to go across the road through a pedestrian bridge and then head west towards 408. The estimated walking distance may be 60 meters and the estimated walking time may be 15 minutes. The total waiting time is therefore also 15 minutes.

In some embodiments, as part of step 310, server 102 may remove certain options by comparing the parameters with the criteria provided by the user. For example, assuming the passenger is only willing to walk for 50 meters (or less than 10 minutes), and wait a total of 15 minutes to be picked-up, server 102 may determine that option (1) should be removed because the total waiting time (e.g., 45 minutes) exceeds the 15 minutes threshold, and option (3) should also be removed because the walking distance (e.g., 60 meters) exceeds the 50 meters limit.

In step 312, server 102 may provide the remaining option(s) to terminal device 110. Terminal device 110 may display the option(s) on display 208 to the user. When there is a single option, the user may be asked to confirm she will accept the option. When multiple options are available, the user may be asked to select one pick-up location among the options presented.

In step 314, server 102 may receive the selected pick-up location from terminal device 110. In step 316, either server 102 or terminal device 110 may determine a driving navigation route for the vehicle and a pedestrian navigation route for the passenger. The navigation routes may be provided to vehicle 120 and terminal device 110 to be displayed on their displays, respectively. The routes can guide the driver of the vehicle and the passenger to pick-up location 406.

Figure 5:
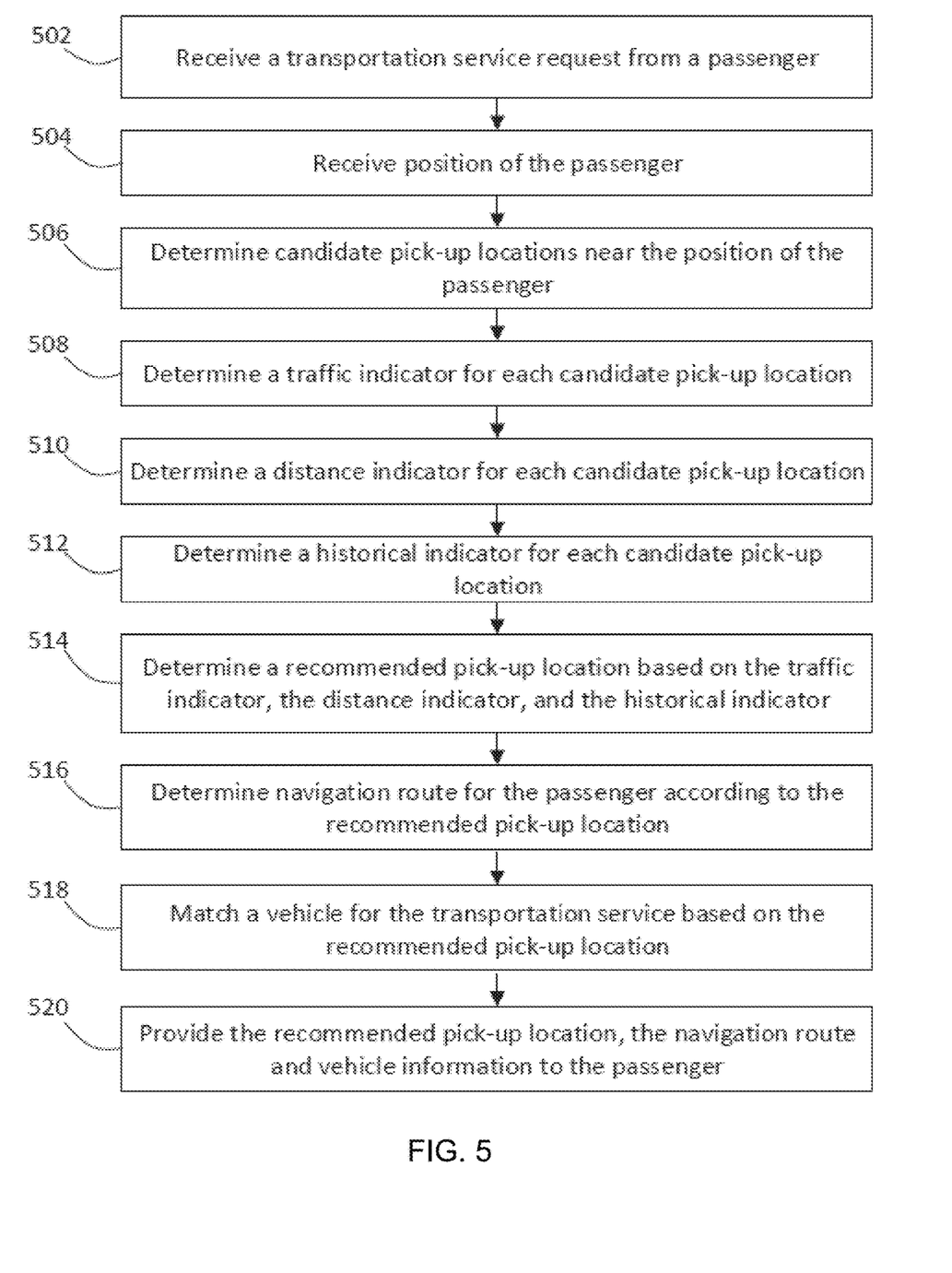
FIG. 5 illustrates a flowchart of an exemplary method for providing transportation service information, according to embodiments of the disclosure.

FIG. 5 is a flowchart illustrating an exemplary method 500 for providing transportation service consistent with disclosed embodiments. Method 500 may be implemented by server 102 and/or terminal device 110, each including at least one processor. In the description below, server 102 is used as an example for implementing method 500. It is contemplated that method 500 can also be implemented by terminal device 110, or jointly by server 102 and terminal device 110. Consistent with the present disclosure, method 500 determines pick-up options for a transportation service request before being matched with a service vehicle. Method 500 then matches the request with a vehicle based on the determined pick-up location. Method 500 may include several steps as described below, some of which may be optional.

Figure 6:
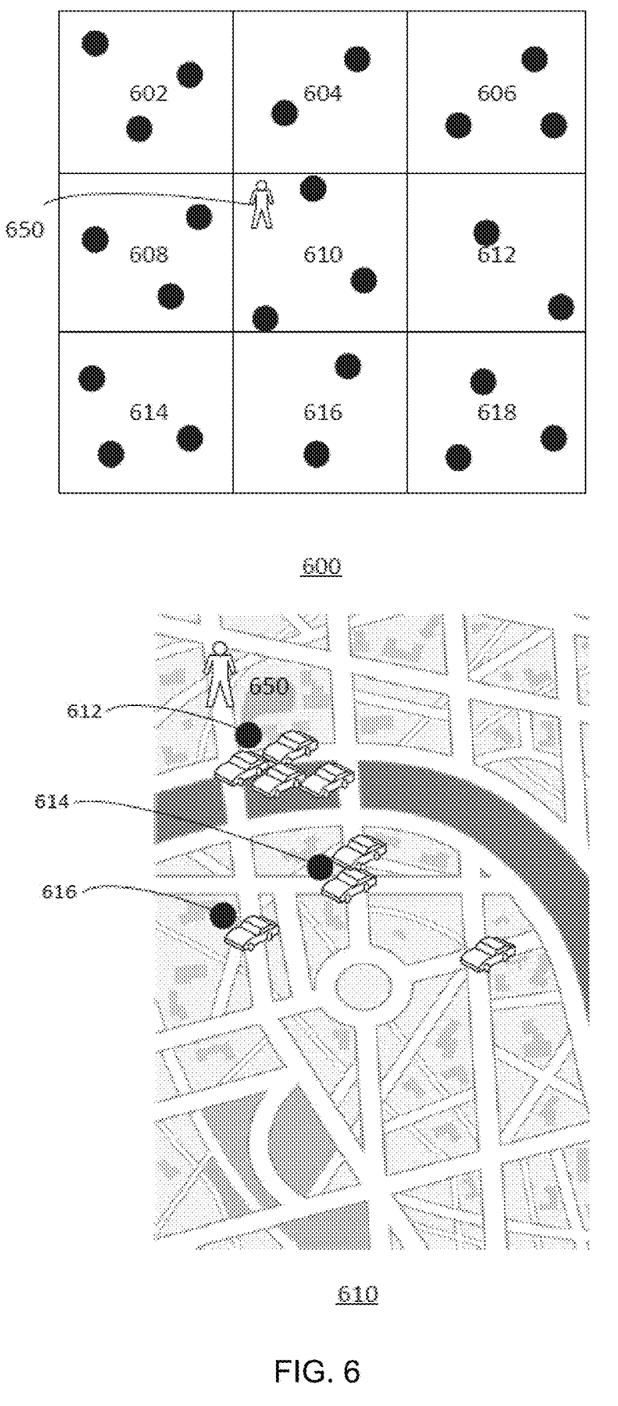
FIG. 6 illustrates determining a pick-up location among candidate pick-up locations, according to embodiments of the disclosure.

FIG. 6 illustrates determining a pick-up location among candidate pick-up locations, according to embodiments of the disclosure. FIG. 5 and FIG. 6 will be described together below.

In step 502, server 102 may receive a transportation service request from a passenger. For example, the transportation service request may be entered by a user on terminal device 110. In step 504, server 102 may receive passenger position 122 from terminal device 110. For example, as shown in FIG. 6, the passenger may be at position 650.

In step 506, server 102 may determine multiple candidate pick-up locations near the position of the passenger. In some embodiments, server 102 may obtain a pick-up location map with predetermined pick-up locations distributed throughout an area (e.g., a city). The area may be divided into different regions, each enclosing several pick-up locations. For example, as shown in FIG. 6, area 600 may be divided into regions 602-618. The shape of area or regions 602-is are exemplary and it is contemplated that they could be other shapes. As shown in FIG. 6, each of regions 602-618 includes 2-3 predetermined pick-up locations. Server 102 may determine that passenger position 650 is within region 610, and thus determine the locations 612, 614, and 616 as the candidate pick-up locations for the passenger.

In some embodiments, server 102 may also use locations within other nearby regions as candidate pick-up locations. In the example of FIG. 6, some locations within region 604 and 608 may also be included as candidate pick-up locations. Specifically, when there is traffic near the locations within regions 610, it may be more convenient for the passenger to be picked up at locations within other regions.

In steps 508-510, server 102 may determine one or more trip indicators. The trip indicators indicate the "expense" of travel on the passenger, including the time expense, the energy expense (e.g., to walk to a pick-up location), etc. In some embodiments, trip indicators may include a traffic indicator, a distance indicator, or a combination thereof.

For example, in step 508, server 102 may determine a traffic indicator for each candidate pick-up location based on the traffic condition near the location. The traffic indicator may take values to indicate the different traffic conditions, e.g., a higher number indicating a worse traffic condition. For example, as shown in FIG. 6, there are severe traffic jams around location 612, slow speed around location 614, and normal speed around location 616. As an example, Table 1 shows a look-up table listing the traffic conditions and the corresponding indicator values.

TABLE 1

| Traffic Condition | Traffic Indicator |
|---|---|
| Severe Jams | 2 |
| Jams | 1.5 |
| Slow Speed | 1.2 |
| Normal Speed | 1 |

In step 510, server 102 may determine a distance indicator for each candidate pick-up location. A distance indicator indicates how far the candidate pick-up location is from the passenger. In some embodiments, the distance indicator may take values of the respective distances, e.g., 100 meters, 200 meters.

In step 512, server may further determine a historical indicator for each candidate pick-up location. A historical indicator indicates how often or how recently a candidate pick-up location was recommended to passengers. For example, Table 2 shows the numbers and most recent times of recommendations made for each candidate location.

TABLE 2

| Candidate Location | Recommendation Nos | Most-recently Recommended |
|---|---|---|
| Location A | 1 | 14:28 pm, 6/13 |
| Location B | 3 | 09:05 pm, 6/15 |
| Location C | 3 | 10:30 am, 6/17 |
| Location D | 0 | |

In step 514, server 102 may determine a recommended pick-up location based on the traffic indicator, the distance indicator, and the historical indicator. In some embodiments, server 102 may aggregate the indicators determined in steps 508-510, and determine an overall trip indicator. For example, the trip indicator may be determined by multiplying the distance indicator and the traffic indicate. If a distance indicator is 100 meters, and the traffic indicator is 2, the trip indicator will be 100*2=200.

Table 3 shows an exemplary listing of trip indicators and historical indicators.

TABLE 3

| Candidate Location | Trip Indicator | Recommendation Nos | Most-recently Recommended |
|---|---|---|---|
| Location A | 242 | 1 | 14:28 pm, 6/13 |
| Location B | 124 | 5 | 09:05 pm, 6/15 |
| Location C | 145.2 | 3 | 10:30 am, 6/17 |
| Location D | 102 | 0 | |

Based on the trip indicators and historical indicators, server 102 may apply certain rules to select one or more pick-up location(s). In some embodiments, server 102 may use a predetermined threshold value of trip indicator. For example, the trip indicator threshold may be set as 120. Applying the threshold to those trip indicators in Table 3, server 102 may select Location D as the pick-up location as it is the only location associated with a trip indicator (e.g., 102) below the threshold 120.

In some embodiments, if all trip indicators exceed the threshold or more than one trip indicators are below the threshold, server 102 may use the historical indicator as the secondary criterium for the selection. For example, the trip indicator threshold may be set as 100. Applying the threshold to those trip indicators in Table 3, server 102 may find that none of the locations is associated with a trip indicator below the threshold 120. As a result, server 102 may select Location B as the pick-up location as it has the highest number of historical recommendations. Alternatively, server 102 may select Location C as the pick-up location as it was most recently recommended.

In step 516, server 102 may determine a navigation route for the passenger to guide her to the recommended pick-up location. In step 518, server 102 may match a vehicle for providing the transportation service based on the recommended pick-up location. In some embodiments, server 102 may consider various factors to find the suitable vehicle, such as the vehicle's distance to the recommended pick-up location, the vehicle's capacity, the traffic condition between the vehicle and the location, etc. Once the vehicle accepts the request, in step 520, server 102 may provide the information to terminal device 110, including, e.g., the recommended pick-up location determined in step 514, the navigation route determined in 516, and information of the vehicle matched in step 518.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A computer-implemented method for providing a transportation service to a passenger, comprising:
   receiving a passenger position from a terminal device;
   receiving a vehicle position from a vehicle, the vehicle being matched to provide the transportation service to the passenger;
   determining, by a processor, pick-up locations for the vehicle to pick up the passenger;
   providing the terminal device with the pick-up locations as options;
   receiving, from the terminal device, a selected pick-up location selected from the provided pick-up locations; and
   navigating the vehicle and the passenger according to the selected pickup location.

2. The method of claim 1, wherein determining pick-up locations includes:
   determining real-time traffic information based on the passenger position and the vehicle position; and
   determining the pick-up locations based on the real-time traffic information.

3. The method of claim 1, wherein each pick-up location is one of the passenger position, the vehicle position, and a location between the passenger position and the vehicle position.

4. The method of claim 1, further comprising:
   receiving a threshold distance from the terminal device;
   determining distances between the passenger position and the pick-up locations; and
   removing the pick-up options associated with distances larger than the threshold distance.

5. The method of claim 1, further comprising:
   determining estimated walking times for the passenger to walk from the passenger position to the pick-up locations; and
   determining estimated driving times for the vehicle to drive from the vehicle position to the pick-up locations.

6. The method of claim 5, further comprising:
   receiving a threshold time from the terminal device; and
   removing the pick-up locations having the estimated walking times or the estimated driving times larger than the threshold time.

7. The method of claim 1, wherein navigating the vehicle and the passenger includes:

providing a pedestrian route to the terminal device for navigating the passenger from the passenger position to the selected pick-up location; and providing a driving route to the vehicle for navigating the vehicle from the vehicle position to the selected pick-up location.

8. A system for providing a transportation service to a passenger, comprising:

a communication interface configured to:
receive a passenger position from a terminal device; and
receive a vehicle position from a vehicle, the vehicle being matched to provide the transportation service to the passenger;

at least one memory; and at least one processor coupled to the communication interface and the at least one memory, the at least one processor configured to:
determine pick-up locations for the vehicle to pick up the passenger;
provide the terminal device with the pick-up locations as options;
receive, from the terminal device, a selected pick-up location selected from the provided pick-up locations; and
navigate the vehicle and the passenger according to the selected pick-up location.

9. The system of claim 8, wherein the at least one processor is further configured to:
determine real-time traffic information based on the passenger position and the vehicle position; and
determine the pick-up locations based on the real-time traffic information.

10. The system of claim 8, wherein each pick-up location is one of the passenger position, the vehicle position, and a location between the passenger position and the vehicle position.

11. The system of claim 8, wherein the at least one processor is further configured to:
receive a threshold distance from the terminal device;
determine distances between the passenger position and the pick-up locations; and
remove the pick-up options associated with distances larger than the threshold distance.

12. The system of claim 8, wherein the at least one processor is further configured to:
determine estimated walking times for the passenger to walk from the passenger position to the pick-up locations; and
determine estimated driving times for the vehicle to drive from the vehicle position to the pick-up locations.

13. The system of claim 12, wherein the at least one processor is further configured to:
receive a threshold time from the terminal device; and
remove the pick-up locations having the estimated walking times or the estimated driving times larger than the threshold time.

14. The system of claim 8, wherein to navigate the vehicle and the passenger, the at least one processor is further directed to:
provide a pedestrian route to the terminal device for navigating the passenger from the passenger position to the selected pick-up location; and
provide a driving route to the vehicle for navigating the vehicle from the vehicle position to the selected pick-up location.

15. A non-transitory computer-readable medium that stores a set of instructions, when executed by at least one processor of an electronic device, cause the electronic device to perform a method for providing a transport service to a passenger, the method comprising:
receiving a passenger position from a terminal device;
receiving a vehicle position from a vehicle, the vehicle being matched to provide the transportation service to the passenger;
determining pick-up locations for the vehicle to pick up the passenger;
providing the terminal device with the pick-up locations as options;
receiving a selected pick-up location selected from the provided pick-up locations; and
navigating the vehicle and the passenger according to the selected pickup location.

16. The non-transitory computer-readable medium of claim 15, wherein determining pick-up locations further includes:
determining real-time traffic information based on the passenger position and the vehicle position; and
determining the pick-up locations based on the real-time traffic information.

17. The non-transitory computer-readable medium of claim 15, wherein the non-transitory computer-readable medium causes the electronic device to perform the method for providing a transport service to a passenger, the method further comprising:
receiving a threshold distance from the terminal device;
determining distances between the passenger position and the pick-up locations; and
removing the pick-up options associated with distances larger than the threshold distance.

18. The non-transitory computer-readable medium of claim 15, wherein the non-transitory computer-readable medium causes the electronic device to perform the method for providing a transport service to a passenger, the method further comprising:
determining estimated walking times for the passenger to walk from the passenger position to the pick-up locations; and
determining estimated driving times for the vehicle to drive from the vehicle position to the pick-up locations.

19. The non-transitory computer-readable medium of claim 18, wherein the non-transitory computer-readable medium causes the electronic device to perform the method for providing a transport service to a passenger, the method further comprising:
receiving a threshold time from the terminal device; and
removing the pick-up locations having the estimated walking times or the estimated driving times larger than the threshold time.

20. The non-transitory computer-readable medium of claim 15, wherein the non-transitory computer-readable medium causes the electronic device to perform the method for providing a transport service to a passenger, the method further comprising:
providing a pedestrian route to the terminal device for navigating the passenger from the passenger position to the selected pick-up location; and
providing a driving route to the vehicle for navigating the vehicle from the vehicle position to the selected pick-up location.

* * * * *